United States Patent [19]

Lal et al.

[11] 3,975,336

[45] Aug. 17, 1976

[54] POLYMERS OF NONCONJUGATED 1,4-DIENES

[75] Inventors: Joginder Lal, Akron; Paul H. Sandstrom, Tallmadge, both of Ohio

[73] Assignee: The Goodyear Tire & Rubber Company, Akron, Ohio

[22] Filed: Nov. 11, 1974

[21] Appl. No.: 522,408

Related U.S. Application Data

[63] Continuation-in-part of Ser. No. 360,239, May 14, 1973, abandoned.

[52] U.S. Cl. ............................ 526/335; 526/237; 526/194; 526/139
[51] Int. Cl.² ................ C08F 210/00; C08F 212/00
[58] Field of Search .................. 260/94.3, 80.78

[56] References Cited
UNITED STATES PATENTS

| | | | |
|---|---|---|---|
| 3,250,753 | 5/1966 | Kottenhahn | 260/80.5 |
| 3,472,830 | 10/1969 | Baxter et al. | 260/94.2 |
| 3,492,281 | 1/1970 | Smith et al. | 260/94.3 |
| 3,658,774 | 4/1972 | Liu | 260/80.78 |

FOREIGN PATENTS OR APPLICATIONS

| | | |
|---|---|---|
| 776,326 | 6/1957 | United Kingdom |

OTHER PUBLICATIONS

Marvel and Stille, J. Amer. Chem. Soc., 1958, 80, 1740–1744.

*Primary Examiner*—Joseph L. Schofer
*Assistant Examiner*—A. L. Clingman
*Attorney, Agent, or Firm*—F. W. Brunner; J. Y. Clowney

[57] ABSTRACT

This invention discloses homopolymers and interpolymers of nonconjugated diolefins defined by the formula:

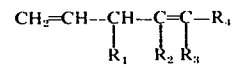

where $R_1$, $R_2$ and $R_3$ may be hydrogen, a lower alkyl group containing up to 4 carbon atoms or an aryl group and $R_4$ may be a lower alkyl group containing up to 4 carbon atoms or an aryl group. It is also disclosed that these homopolymers and interpolymers can be prepared by solution polymerization employing cationic catalyst systems and also coordination catalyst systems. The polymers are either resinous or rubbery in nature.

8 Claims, No Drawings

POLYMERS OF NONCONJUGATED 1,4-DIENES

This application is a Continuation-in-part of application Ser. No. 360,239 filed May 14, 1973, and now abandoned.

This invention relates to methods of preparation and compositions of matter resulting from the polymerization and copolymerization of nonconjugated diolefins.

The monomeric materials to which this invention relates are defined in accordance with the general formula:

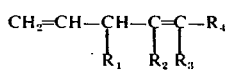

where $R_1$, $R_2$ and $R_3$ may be hydrogen, a lower alkyl group containing up to 4 carbon atoms or an aryl group and $R_4$ may be a lower alkyl group containing up to 4 carbon atoms or an aryl group. Some representative examples are: cls-1,4-hexadiene, trans-1,4-hexadiene, cis-1,4-heptadiene, trans-1,4-heptadiene, 4-methyl-1,4-hexadiene, 5-methyl-1,4-hexadiene, 4-ethyl-1,4-hexadiene, 5-ethyl-1,4-hexadiene, 4-butyl-1,4-hexadiene, 5-butyl-1,4-hexadiene, 3-methyl-1,4-hexadiene, 3,4-dimethyl-1,4-hexadiene, cis-1,4-nonadiene, trans-1,4-nonadiene, 6-phenyl-1,4-hexadiene, 4-phenyl-1,4-hexadiene, 4-p-tolyl-1,4-hexadiene and 4,5-diphenyl-1,4-hexadiene and mixtures thereof, thus, indicating that interpolymers as well as homopolymers may be prepared in accordance with the practice of this invention.

Certain of the homopolymers and interpolymers of this invention are rubbery in nature and exhibit a striking combination of fast cure rate, excellent resistance to ozone attack, low Mooney viscosity and high damping (i.e. low resilience).

The polymerizations of the monomers of this invention to form rubbery, leathery or resinous polymers may be accomplished by the use of catalysts generally known as coordination catalysts utilizing either bulk polymerizations or solution polymerizations in the presence of inert solvents. Both batch and continuous polymerization techniques may be used.

The polymerizations of the monomers of this invention to form these rubbery, leathery or resinous homopolymers and interpolymers are also accomplished by the use of cationic catalyst systems, using both bulk and solution polymerization techniques and using both batch and continuous processes.

If solution polymerization techniques are employed, any inert solvent which does not adversely affect the coordination catalyst polymerization system or the resulting polymers formed may be employed. The nonconjugated diolefin, or mixtures thereof, is simply dissolved in an inert solvent prior to the addition of the catalyst to start the polymerization. Representative of suitable solvents are saturated aliphatic hydrocarbons such as pentane and heptane; cycloaliphatic hydrocarbons such as cyclohexane; aromatic hydrocarbons such as benzene and toluene; and chlorinated hydrocarbons such as chlorobenzene and tetrachloroethylene. The amount of solvent, if a solvent is employed, may vary widely and is not critical to the solution polymerization system. The amounts usually employed are sufficient to obtain a solution of the homopolymers and interpolymers which is not too viscous so that suitable heat transfer rates can be maintained. Usually the amount of solvent to monomer employed ranges from about 1/1 to about 10/1 on a weight basis with about 3/1 to about 5/1 being preferred.

The amount of catalyst employed in the polymerization of the monomers of this invention with coordination catalysts may vary widely and will depend on a number of factors such as monomer concentration, purity of the system, temperature of polymerization and other such known factors. The speed of the polymerization reaction is furthermore influenced by the degree of sub-division of the active surface with which the activated compounds are brought into contact. For instance, the active surface catalyst can be adsorbed on cryolite or on a finely divided filler such as silica or carbon black. It has been found suitable to use 0.01 to 5 parts of the catalyst per 100 weight parts of the monomer, the preferred range being 0.2 to 3 parts. All parts are on a weight basis. Polymerization may be carried out at −78°C to +100°C, the preferred range being 0°C to +50°C.

As has been indicated, certain of the polymers of this invention are resinous in nature and to form such polymers, a cationic catalyst system is employed. Suitable cationic catalysts are Lewis acid metal halides and cation-forming substances. Typical examples are: $BeCl_2$, $BF_3$, $AlCl_3$, $AlBr_3$, $TiCl_4$, $SnCl_4$, $SbCl_5$, $FeCl_3$, $EtAlCl_2$, $Et_2AtCl$ and silver perchlorate. Suitable cocatalysts may be used in conjunction with these Lewis acids and cation-forming substances. Cationic catalysts and cocatalysts of various types have been described in "The Chemistry of Cationic Polymerization," Editor: P H Plesch, Pergamon Press (1965). Cationic catalysts $EtAlCl_2$ and $Et_2AlCl$ are preferred in polymerizing the monomers of this invention.

The amount of cationic catalyst employed in the polymerization of this invention may vary widely and will depend on a number of factors known to those skilled in the art such as the purity of the system, the polymerization rates desired, temperature of polymerization, dielectric constant of polymerization solvent and other such known factors. It has been found that suitable polymerizations of the nonconjugated diolefins can be obtained by the use of 0.005 to 5 weight parts of the catalyst per 100 weight parts of monomer, the preferred range being 0.1 to 2 parts. Polymerization may be conducted at −100°C to +100°C, the preferred range being −20°C to +40°C. Suitable solvents are: aliphatic, cycloaliphatic and aromatic hydrocarbons, for instance, butane, hexane, cyclohexane, benzene, toluene; chlorinated hydrocarbons, for instance, ethyl chloride, dichloroethane, dichloromethane; ethers such as diethyl ether and the like.

As has been indicated, certain of the homopolymers and interpolymers of nonconjugated diolefins of this invention are rubbery in nature and exhibit a striking combination of a fast cure rate, excellent resistance to ozone attack, low Mooney viscosity and high damping (low resilience). It has been indicated that to form these rubbery polymers a catalyst generally known as a coordination type catalyst may be used. However, depending on the structure of the monomers employed, the resulting polymers may be leathery or resinous in character. Representative of such catalyst systems is a mixture of an organometallic reducing agent with a transition metal salt, or mixtures thereof. Compounds of the transition heavy metals are those derived from metal of the B sub-groups of IV to VII or Group VIII of the Periodic Table. The organometallic reducing agents are selected from organometallic compounds, hydrides and free metals of Groups I to IV of the Periodic Table. The compounds of the transition metals are preferably halides, oxyhalides and alcoholates, the preferred metals being titanium and vanadium. The metals of the organometallic reducing agents are preferably lithium, magnesium, aluminum and tin and the organic portions are preferably alkyl radicals. In these organometallic compounds, the valences of the metal may be partially satisfied by halogen or alkoxyl, provided, of course, that at least one bond connects the metal with an organic radical. Mixtures of two or more compounds of the type described above may often be used to advantage. These catalysts are not the subject of the present application. Coordination catalysts have been reviewed in "Stereochemistry of Macromolecules," edited by A D Ketley and published by Marcel Dekker, Inc, New York (1967). The addition of a third component, consisting of an electron donor molecule, may be employed to the benefit of the above coordination catalysts. Examples of donor molecules include various amines, phosphines, ethers, pyridines, phosphoric triamides, vinylsilanes, alkoxysilanes, and related compounds classified as electron donor molecules. The molar ratio of the donor compound to transition metal compounds may be between 0.1 – 10, the preferred ratio being 0.3 – 5.

The rubbery homopolymers and interpolymers of this invention are extremely useful in producing rubber products in which there is desired a fast cure rate and a general resistance to the ravaging effects of ozone and oxygen. It should be noted that unlike old homopolymers and copolymers of conjugated diolefins heretofore known, the homopolymers and interpolymers of this invention are unique in that there are no double bonds situated along the polymer chain. For instance, in the prior art in processes such as emulsion polymerizations of conjugated diolefins by means of a free radical catalyst system there are formed a mixture of polymers which contain a variety of spacial configurations. For instance, in the homopolymerization of the monomer 1,3-butadiene by such a process, a mixture of cis-1,4-, and trans-1,4- and 1,2-structures is formed:

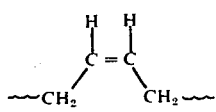

cis-1,4-repeat unit of polybutadiene

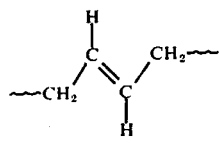

trans-1,4-repeat unit of polybutadiene ( ⏜ designates a polymer chain)

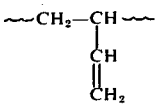

1,2-repeat unit of polybutadiene

In the polymer, 1,4-polybutadines, the residual double bonds appear in the polymer chain or backbone of the polymers. Likewise, in the solution polymerization of conjugated diolefins such as 1,3-butadiene or isoprene using a coordination catalyst or alkyl lithium, a high percentage of 1,4-polymers is obtained which have in their backbones the residual double bonds. It is these double bonds in the polymer chain which are subject to attack by ozone, and which also activate adjacent carbon atoms for attack by oxygen. These attacks usually result in scission of the polymer chains and, thus, the resulting polymers are of much lower molecular weights after such attacks. When these polymers are used in fabricated products, their properties deteriorate on aging as a result of the attack of oxygen and/or ozone.

In contrast, the homopolymers and interpolymers of the nonconjugated diolefins of this invention have repeating units principally, that is 50 molar percent or higher, of the following configuration resulting from 1,2-polymerization, i.e., when polymerization takes place through the terminal double bond:

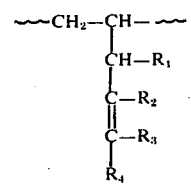

1,2-repeat unit of 1,4-dienes where $R_1$, $R_2$, $R_3$ and $R_4$ have the meaning described earlier.

A structural examination of some homopolymers of these nonconjugated 1,4-dienes with nuclear magnetic resonance (NMR) spectroscopy has revealed that in addition to the 1,2-repeat unit (structure shown above) there is also present another structure the relative amount of which depends on the particular momoner undergoing polymerization and conditions of polymerization. For instance, when trans-1,4-hexadiene monomer is polymerized with a coordination catalyst, NMR spectrum reveals the presence of

moiety, i.e., a methyl group located on a saturated carbon atom. The relative amount of this structure increases as the polymerization time is increased. The mechanism of formation of this structure is not understood. Similarly, when cis-1,4-hexadiene monomer is polymerized, the presence of

in the homopolymer is revealed by NMR. However, the relative amount of this latter structure is lower in this polymer than in the case of the homopolymer of trans-1,4-hexadiene. Thus, the homopolymers of both trans-1,4-hexadiene and cis-1,4-hexadiene contain a mixture of structures - one resulting from the 1,2-polymerization and the second resulting from an unknown mechanism:

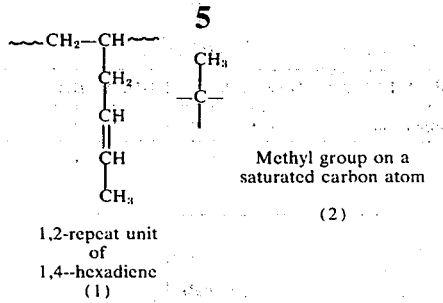

1,2-repeat unit of 1,4-hexadiene (1)

In marked contrast to the above homopolymers of trans-1,4-hexadiene and cis-1,4-hexadiene, the homopolymer of 5-methyl-1,4-hexadiene prepared with a coordination catalyst contains almost exclusively 1,2-repeat units:

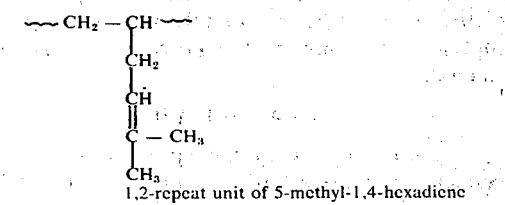

1,2-repeat unit of 5-methyl-1,4-hexadiene

The $$\begin{array}{c} CH_3 \\ | \\ -C- \\ | \end{array}$$

moiety is not detectable in the polymer. It is apparent from the homopolymers of 1,4-dienes possess novel structural features which are not taught by the prior art.

It should be noticed that in the polymers set forth above, the main chain or backbone contains no residual double bonds. All of the residual double bonds which are useful as curing sites are pendent to the main chains of polymers. Thus, even though an ozone attack could be made, one would lose only a few carbon atoms due to the double bond scission and the main polymer chain would remain unaffected and the molecular weight of the polymer would not be substantially reduced.

Under certain polymerization conditions, particularly under cationic polymerization, a fraction of the residual double bonds may also take part in polymerization by the well-known inter-intramolecular polymerization to give cyclic structures, resulting in the loss of some or most of residual double bonds. These cyclic structures are also resistant to attack by ozone.

The resinous polymers of this invention are useful for stiffening the rubber-like polymers. They are also useful in the formation of adhesives and coatings wherein superior aging properties are required.

Another novel feature exhibited by the rubbers prepared according to this invention is low Mooney viscosity. The term Mooney viscosity refers to the resistance of a polymer to shear in a Mooney viscometer. It is measured by the amount of torque developed. For instance, the homopolymer of trans-1,4-hexadiene having an inherent viscosity of 5.3 deciliters/gram (dl/g) exhibited a Mooney viscosity of only 15. This is in striking contrast to values of 75-90 observed under identical experimental conditions for high cis-1,4-polybutadiene or high cis-1,4-polyisoprene having inherent viscosities of about 4 dl/g. The very low Mooney viscosity of poly(trans-1,4-hexadiene) is believed to be due to predominantly 1,2-structure of the polymer discussed earlier. It should be noted that such low Mooney viscosity rubbers will require significantly less energy for mixing with compounding ingredients in a Banbury mixer than is found to be the case with high Mooney viscosity rubbers such as cis-1,4-polybutadiene or Mooney viscosity rubbers such as cis-1,4-polybutadiene or cis-1,4-polyisoprene.

The invention may be further illustrated by reference to the following examples which are intended to be representative rather than restrictive of the scope of the invention. All polymerizations were conducted in an inert atomsphere of nitrogen. After polymerization, the reaction mixtures were precipitated in excess methanol containing dissolved stabilizer. The isolated polymers were dried in a vacuum oven at about 40°C. Inherent viscosities of the polymers were determined at 30°C in toluene solutions containing 0.1 % of a stabilizer. The concentrations of the polymers were usually about 0.1 to 0.2 gram in 100 milliliters of the solvent. The inherent viscosities are expressed in units of deciliters/gram (dl/g).

Mooney viscosity of the rubbers was measured according to ASTM D 1646, using a large rotor. The temperature of measurement was 100°C (212°F).

NMR spectra were run on a Varian A-60 spectrometer from 0 to 500 Hertz. The spectra were taken in carbon tetrachloride solution at 25°C using tetramethylsilane (TMS) as an internal reference. The intensities of the peaks were measured electronically with the integrator in the spectrometer.

Dynamic mechanical properties were measured at specified temperatures on vulcanized cylinderical samples (one half inch long, one half inch diameter) with the Goodyear Forced Resonance Vibrotester [S D Gehman, D E Woodford, and R B Stambaugh, Industrial Engineering Chemistry, Vol 33, p 1032 (1941)].

EXAMPLE I

A mixture containing 20 milliliters (ml) of cis1,4-hexadiene and 20 ml of pentane was sparged with nitrogen in a 4-oz bottle. Triethylaluminum, 4.5 ml of a 1.56 molar (M) solution in heptane, was added, followed by 8.0 ml of a mixture of triethylaluminum/vanadium tetrachloride/titanium tetrachloride catalyst in a suspension in heptane which contained 0.50 M of the titanium plus vanadium halides. The titanium/vanadium atomic ratio was 1/1 and the aluminum/titanium plus vanadium atomic ratio was 0.4/1. The atomic ratio of the aluminum to transition metal in the final catalyst was 2.5/1. The solution of cis-1,4-hexadiene and pentane and catalyst mixture was allowed to polymerize for 48 hours at room temperature (about 25°C) while being mechanically shaken. The resulting homopolymer was precipitated by adding an excess of methanol containing phenyl beta-naphthylamine as a stabilizer and dried under vacuum. The polymer formed was 18.6 percent of the cis-1,4-hexadiene charged. The poly-(cis-1,4-hexadiene) produced had an inherent viscosity of 1.6.

EXAMPLE II

In a procedure similar to that followed in Example I, 50 ml of trans-1,4-hexadiene was polymerized using alphatitanium trichloride/diethylaluminum chloride catalyst. Solutions containing 50 ml of trans-1,4-hexadiene and 50 ml of pentane were sparged with nitrogen in 8-oz bottles. To these bottles was added 8.0 ml of a 1.5 M solution of diethylaluminum chloride in heptane, followed by 6.0 ml of a 1.0 M suspension in heptane of alpha-titanium trichloride. The titanium trichloride used here and in subsequent examples was obtained from Stauffer Chemical. It contained 0.33 mole of aluminum trichloride per mole of the titanium trichloride. The molar ratio of the diethylaluminum chloride to the titanium trichloride was 2/1. The solution was allowed to polymerize for 48 hours at room temperature while being mechanically shaken. The homopolymer of the trans-1,4-hexadiene was isolated according to the procedure outlined in Example I. There was obtained a polymer conversion of 23.8 percent having an inherent viscosity of 1.5.

EXAMPLE III

In a manner identical to Example II, except that a mixture of 4-methyl-1,4-hexadiene and 5-methyl-1,4-hexadiene (molar ratio 60:40) was employed instead of the trans-1,4-hexadiene, a copolymer yield of 33.7 percent was obtained having an inherent viscosity of 0.92.

EXAMPLE IV

A solution containing 25 ml of trans-1,4-hexadiene and 25 ml of a mixture of 4-methyl-1,4-hexadiene and 5-methyl-1,4-hexadiene was sparged with nitrogen in a 4-oz bottle. The ratio of 4-methyl-hexadiene to 5-methyl-hexadiene was 1.5:1. To this bottle was added 4.0 ml of a 1.5 M solution of triethylaluminum in heptane, followed by 3.0 ml of a 1.0 M suspension in heptane of alpha-titanium trichloride. The molar ratio of the triethylaluminum to the titanium trichloride was 2/1. The solution was allowed to polymerize for 48 hours at 25°C. in a polymerization bath. The polymer was isolated as described in Example I. A rubbery material in 13 percent conversion was obtained having an inherent viscosity of 2.1.

EXAMPLE V

Solutions containing 50 ml of trans-1,4-hexadiene and 50 ml of heptane were sparged with nitrogen in 8-oz bottles. Next, 2.8 ml of a 1.5 M solution of triethylaluminum (Et$_3$Al) in heptane was added, followed by 4.0 ml of a preformed Et$_3$Al/VCl$_4$/TiCl$_4$ catalyst suspension in heptane [0.50 M (Ti+V halides); Ti/V atomic ratio =1; Al/(Ti+V) atomic ratio = 0.4]. The atomic ratio of aluminum to transition metals in the final catalyst was 2.5. The solutions were polymerized at 25°C, 50°C and 70°C in a polymerization bath. The polymers were precipitated in excess methanol containing 2,6-ditert-butyl-p-cresol stabilizer and dried under vacuum. Conversion and molecular weight data on these polymers are given in the table below:

TABLE 1

POLYMERIZATION OF TRANS -1,4-HEXADIENE (24 hours)

| Polymerization Temperature, °C | Conversion to Polymer, % | Inherent Viscosity | Gel, % |
|---|---|---|---|
| 25 | 10 | 2.6 | 7 |
| 50 | 18 | 1.9 | 9 |
| 70 | 24 | 0.6 | 48 |

EXAMPLE VI

A solution containing 25 ml of trans-1,4-hexadiene and 25 ml of heptane was sparged with nitrogen in a 4-oz bottle. Next, 0.4 ml of 1.5 M EtAlCl$_2$ in heptane was added. The solution was polymerized for 48 hours at 25°C in a polymerization bath. The polymer was isolated as described in Example V. A white powdery material in an amount of 8 percent conversion was obtained.

EXAMPLE VII

To separate bottles containing 50 ml of trans-1,4-hexadiene and 50 ml of pentane, which had been sparged with nitrogen, was added 4.5 millimoles (mmoles) of triethylaluminum and 3.0 mmoles of α-titanium trichloride suspension in heptane; 4.5 mmoles of triisobutylaluminum and 3.0 mmoles of α-titanium trichloride; 4.5 mmoles of diethylaluminum chloride and 3.0 mmoles of α-titanium trichloride, respectively. Each of the three mixtures was allowed to polymerize for 96 hours at 25°C. The polymers obtained were isolated as described in Example V. Polymer conversions and inherent viscosities (in parentheses) were 21% (1.6), 17% (1.2) and 4% (2.8), respectively.

EXAMPLE VIII

A solution containing 10 ml of 5-methyl-1,4-hexadiene and 10 ml of heptane was sparged with nitrogen in a 4-oz bottle. Next, 2.0 ml of a 1.5 M solution of Et$_2$AlCl in heptane was added, followed by 2.0 ml of a 1.0 M α-TiCl$_3$ suspension in heptane. The molar ratio of Et$_2$AlCl to α-TiCl$_3$ was 1.5 in the final catalyst. The solution was polymerized for 18 hours at 25°C in a polymerization bath. The polymer was isolated as described in Example V. A rubbery material in 87 percent conversion was obtained. It exhibited a melting temperature of 39°C by differential thermal analysis.

EXAMPLE IX

The effect of Et$_3$Al/α-TiCl$_3$ ratio on the polymerization of trans-1,4-hexadiene was studied at 25°C. The data are shown in the table below:

TABLE 2

| Ml of Trans-1,4-Hexadiene | Ml of Et$_3$Al Solution* | Ml of α-TiCl$_3$ Suspension** | Molar Ratio Et$_3$Al/ α-TiCl$_3$ | Conver-*** sion to Polymer, % | Inherent Viscosity |
|---|---|---|---|---|---|
| 50 | 1.0 | 3.0 | 0.5 | 6 | 3.6 |
| 50 | 2.0 | 3.0 | 1.0 | 11 | 2.5 |
| 50 | 4.0 | 3.0 | 2.0 | 21 | 2.1 |
| 50 | 8.0 | 3.0 | 4.0 | 25 | 2.0 |

*1.5 M solution in heptane
**1.0 M suspension in heptane
***Polymerization time was 24 hours

EXAMPLE X

The effects of α-picoline were studied in this example. One control was run using no α-picoline. The results using α-picoline are given in Table 3 below.

Solutions containing 50 ml of trans-1,4-hexadiene and 50 ml of pentane were sparged with nitrogen in three separate 8-oz bottles. Before catalyst addition, 3.0 mmoles of α-picoline were added to one solution and 6.0 mmoles to another. Next, 4.0 ml of a 1.5 M solution of $Et_3Al$ in heptane was added, followed by 6.0 ml of a 1.0 M α-$TiCl_3$ suspension in heptane. The molar ratio of $Et_3Al$ to α-$TiCl_3$ was 1.0 in the final catalyst. The solutions were polymerized for 48 hours at 25°C in a polymerization bath. The polymers were then isolated as described in Example V. Polymer conversions and inherent viscosities are indicated in the following table. It is apparent that α-picoline addition increases the polymer yield.

TABLE 3

EFFECT OF α-PICOLINE ADDITION ON THE POLYMERIZATION OF TRANS-1,4-HEXADIENE

| Molar Ratio α-picoline/α-$TiCl_3$ | Polymer Yield, % | Inherent Viscosity dl/g |
|---|---|---|
| — | 18 | 1.5 |
| 0.5 | 26 | 1.3 |
| 1.0 | 31 | 1.8 |

EXAMPLE XI

Several 50 ml portions of trans-1,4-hexadiene were sparged with nitrogen in 4-oz bottles. Before catalyst addition, various amounts of hexamethylphosphoric triamide (HPT) or triphenylphosphine (TPP) were added to the diene. Next, 4.0 ml of a 1.5 M solution of $Et_3Al$ in heptane was added, followed by 3.0 ml of a 1.0 M α-$TiCl_3$ (Stauffer Chemical Co, contains 0.33 moles $AlCl_3$) suspension in heptane. The molar ratio of $Et_3Al$ to α$TiCl_3$ was 2.0 in the final catalyst. The monomer was polymerized for 24 hours at 25°C in a polymerization bath. The polymers were isolated as described in Example V. Polymer conversions and inherent viscosities are indicated in the following table:

TABLE 4

POLYMERIZATION OF TRANS-1,4-HEXADIENE

| Molar Ratio TPP/α-$TiCl_3$ | Molar Ratio HPT/α-$TiCl_3$ | Polymer Yield, % | Inherent Viscosity dl/g |
|---|---|---|---|
| — | — | 21 | 2.1 |
| .33 | — | 32 | 1.5 |
| 1.0 | — | 26 | 1.6 |
| 1.5 | — | 25 | 1.5 |
| 2.0 | — | 23 | 1.5 |
| 4.0 | — | 21 | — |
| — | 0.33 | 25 | 2.6 |
| — | 1.0 | 23 | 3.4 |
| — | 1.5 | 22 | 4.1 |
| — | 2.0 | 17 | 5.1 |
| — | 4.0 | 0 | — |

In another experiment, about 100 grams of the polymer was prepared using HPT/α-$TiCl_3$ molar ratio of 1.5 and $Et_3Al$/α-$TiCl_3$ ratio of 2.0. The inherent viscosity of the resulting polymer was 5.3. It had a Mooney viscosity of only 15.

EXAMPLE XII

The effects of tetravinylsilane and diphenyldimethoxysilane on a $Et_3Al$/α-$TiCl_3$ catalyst were studied in this example. Solutions containing 50 ml of trans-1,4-hexadiene and 50 ml of pentane were sparged with nitrogen in 8-oz bottles. Before catalyst addition, 1.5 mmoles and 6.0 mmoles of the silane additives were added to the separate solutions. Next, 4.0 ml of a 1.5 M solution of $Et_3Al$ in heptane was added, followed by 3.0 ml of a 1.0 M α-$TiCl_3$ suspension in heptane. The molar ratio of $Et_3Al$ to α-$TiCl_3$ was 2.0 in the final catalyst. The solutions were polymerized for 24 hours at 25°C in a polymerization bath. The polymers were then isolated as described in Example V. Polymer conversions and inherent viscosities are indicated in the following table. It is apparent that both additives increase the polymer molecular weight.

TABLE 5

POLYMERIZATION OF TRANS-1,4-HEXADIENE

| Molar Ratio Tetravinylsilane/α-$TiCl_3$ | Molar Ratio Diphenyldimethoxysilane/α-$TiCl_3$ | Polymer Conversion,% | Inherent Viscosity dl/g |
|---|---|---|---|
| — | — | 14 | 1.8 |
| 0.5 | — | 12 | 2.8 |
| 2.0 | — | 10 | 3.0 |
| — | 0.5 | 17 | 2.5 |
| — | 2.0 | 13 | 4.7 |

EXAMPLE XIII

A comparison of some of the vulcanizate properties of a polymer of trans-1,4-hexadiene with that of natural rubber (no. 1 smoked sheet) was made in this example. The trans-1,4-hexadiene was polymerized with a hexamethylphosphoric triamide (HPT) modified $Et_3Al$/α-$TiCl_3$ catalyst as described in Example XI. The conversion to polymer (inherent viscosity = 3.5) was 29 percent in 96 hours at 25°C. The polymer was isolated as described in Example V. The natural rubber and the polymer of trans-1,4-hexadiene were mixed with 50 phr ISAF carbon black, 2 phr stearic acid, 3 phr zinc oxide, and 1 phr of aryl-p-phenylene diamines in separate Banbury batches. After mill addition of 0.65 phr benzothiazyl disulfide, 0.60 phr diphenylguanidine, and 1.60 phr sulfur, they were press cured for 20 minutes at 300°F. The results of a vibrotester test are shown below:

TABLE 6

| | Dynamic Resilience, % | |
|---|---|---|
| | 30°C | 93°C |
| Hexadiene Polymer | 12 | 29 |
| Natural Rubber | 39 | 47 |

The hexadiene rubber vulcanizate exhibits a much lower resilience, i.e, high damping, at both test temperatures as compared to the natural rubber vulcanizate. The vulcanizates were exposed to static and dynamic (30 flexes/minute) ozone testing at 25 percent strain and 100°F using an ozone concentration of 50 pphm. The natural rubber vulcanizate gave heavy cracking after 96 hours of static testing and only 24 hours of dynamic testing. The hexadiene rubber vulcanizate showed no signs of ozone cracking after 216 hours of testing.

EXAMPLE XIV

For NMR spectroscopic studies, trans-1,4-hexadiene and cis-1,4-hexadiene were polymerized separately at about 25°C for several weeks using the catalyst described in Example I. Our object was to study the effect of polymerization time on polymer structure. The absorption peaks (relative to TMS), their intensity and structural assignments are given in Table 7.

TABLE 7

| Peaks, ppm | Intensities, % Poly(cis-1,4-hexadiene) | Poly(trans-1,4-hexadiene) | Structural Assignments |
|---|---|---|---|
| 0.5–1.0 | 12.3 | 16.3 | $CH_3-\overset{|}{\underset{|}{C}}-$ |
| 1.0–2.5 | 71.0 | 64.4 | $\begin{cases} -\overset{|}{C}H-CH_2- \\ -CH_2-\underset{|}{C}=\underset{|}{C}- \\ CH_3-\underset{|}{C}=\underset{|}{C}- \end{cases}$ |
| 4.5–6.0 | 16.7 | 19.4 | $-CH=CH-$ |

The peaks at 4.5–6.0 ppm are due to the olefinic protons, while those at 0.5–2.5 ppm are from the aliphatic protons. The peaks at 1.0–2.5 and 4.5–6.0 are consistent with the structure

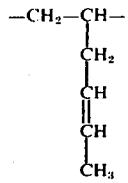

i.e., 1,2-polymerization of each of these monomers. However, the absorption peak at 0.5–1.0 ppm due to a methyl group attached to a non-olefinic carbon is quite unexpected. The intensity of this absorption peak suggests that both polymers contain substantial amounts of this structure.

It should be noted further that this peak at 0.5–1.0 ppm decreases as the polymerization time is decreased. Thus, polymers obtained after the reaction interval of 2 days were essentially free from this absorption. It is apparent that the composition of these polymers contains structure whose contribution depends on the reaction time or conversion.

While certain representative embodiments and details have been shown for the purpose of illustrating the invention, it will be apparent to those skilled in this art that various changes and modifications may be made therein without departing from the spirit or scope of the invention.

What is claimed is:

1. The compositions of matter comprising homopolymers and interpolymers of nonconjugated diolefins defined by the formula:

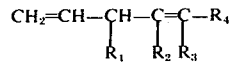

where $R_1$, $R_2$ and $R_3$ are from the group of hydrogen, a lower alkyl group containing up to 4 carbon atoms or an aryl group and $R_4$ is from the group of a lower alkyl group containing up to 4 carbon atoms or an aryl group, said polymers containing at least 50 mole percent of their repeat units of the structure.

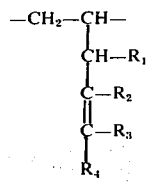

where $R_1$, $R_2$, $R_3$ and $R_4$ are defined as before.

2. The composition according to claim 1 in which the nonconjugated diolefin is cis-1,4-hexadiene.
3. The composition according to claim 1 in which the nonconjugated diolefin is trans-1,4-hexadiene.
4. The composition according to claim 1 in which the nonconjugated diolefin is 4-methyl-1,4-hexadiene.
5. The composition according to claim 1 in which the nonconjugated diolefin is 5-methyl-1,4-hexadiene.
6. The composition according to claim 1 in which the nonconjugated diolefin is a mixture of cis-1,4- and trans-1,4-hexadienes.
7. The composition according to claim 1 in which the nonconjugated diolefin is a mixture of 4-methyl-1,4-hexadiene and 5-hexadiene.
8. The composition according to claim 1 in which the nonconjugated diolefin is a mixture of trans-1,4-hexadiene, 4-methyl-1,4-hexadiene and 5-methyl-1,4-hexadiene.

* * * * *